(12) United States Patent
Russ et al.

(10) Patent No.: US 7,861,509 B2
(45) Date of Patent: Jan. 4, 2011

(54) METHODS AND SYSTEMS FOR GAS TURBINE SYNGAS WARM-UP WITH LOW EMISSIONS

(75) Inventors: Fredric S. Russ, Humble, TX (US); Douglas K. Holland, Montgomery, TX (US); Christopher J. Villa, Houston, TX (US); Jerrold S. Kassman, Katy, TX (US); Eileen T. Nguyen, Houston, TX (US); Matthew C. Prater, Greer, SC (US)

(73) Assignee: General Electric Company, Schenectady, NY (US)

( * ) Notice: Subject to any disclaimer, the term of this patent is extended or adjusted under 35 U.S.C. 154(b) by 1242 days.

(21) Appl. No.: 11/625,990

(22) Filed: Jan. 23, 2007

(65) Prior Publication Data

US 2010/0115962 A1    May 13, 2010

(51) Int. Cl.
    *F02G 3/00*    (2006.01)
(52) U.S. Cl. .................... 60/39.094; 60/781; 60/39.464
(58) Field of Classification Search .............. 60/39.094, 60/734, 736, 781, 39.464, 39.182, 39.12, 60/780
    See application file for complete search history.

(56) References Cited

U.S. PATENT DOCUMENTS

| | | | |
|---|---|---|---|
| 3,868,817 A * | 3/1975 | Marion et al. .................. 60/781 |
| 4,341,069 A * | 7/1982 | Bell et al. ...................... 60/781 |
| 4,831,817 A | 5/1989 | Linhardt |
| 5,319,924 A * | 6/1994 | Wallace et al. ................. 60/781 |
| 5,345,756 A * | 9/1994 | Jahnke et al. .................. 60/781 |
| 5,394,686 A | 3/1995 | Child et al. |
| 5,688,296 A | 11/1997 | Andrus, Jr. et al. |
| 5,912,198 A | 6/1999 | Feitelberg et al. |
| 5,953,899 A * | 9/1999 | Rao et al. ...................... 60/781 |
| 6,061,936 A | 5/2000 | Jahnke |
| 6,233,916 B1 * | 5/2001 | Anand et al. ................... 60/784 |
| 6,370,880 B1 | 4/2002 | Smith et al. |
| 6,432,368 B1 | 8/2002 | Feitelberg et al. |
| 6,868,677 B2 * | 3/2005 | Viteri et al. .................... 60/784 |
| 6,871,502 B2 * | 3/2005 | Marin et al. ................... 60/772 |
| 7,056,487 B2 | 6/2006 | Newby |
| 2001/0022087 A1 * | 9/2001 | Kobayashi et al. ............ 60/736 |
| 2004/0011057 A1 | 1/2004 | Huber |
| 2004/0247509 A1 | 12/2004 | Newby |
| 2005/0268556 A1 | 12/2005 | Rogers |
| 2006/0260189 A1 | 11/2006 | Reddy et al. |
| 2008/0134658 A1 * | 6/2008 | Yoshida ...................... 60/39.12 |

\* cited by examiner

*Primary Examiner*—William H Rodríguez
(74) *Attorney, Agent, or Firm*—Armstrong Teasdale LLP

(57) ABSTRACT

Methods and systems of operating an integrated gasification combined cycle system are provided. The method includes coupling a non-fuel fluid conduit to a fuel conduit, warming a flow of non-fuel fluid, and channeling the warmed non-fuel fluid through the fuel conduit such that heat from the warmed non-fuel fluid heats the fuel conduit to a predetermined temperature.

20 Claims, 2 Drawing Sheets

METHODS AND SYSTEMS FOR GAS TURBINE SYNGAS WARM-UP WITH LOW EMISSIONS

BACKGROUND OF THE INVENTION

This invention relates generally to integrated gasification combined cycle (IGCC) systems, and more specifically to methods and systems for facilitating reduced flaring during startup of the system.

At least some known IGCC systems startup on a fuel such as natural gas to provide heat to various subsystems and to warm-up components of the IGCC system such that operational temperature limits are not exceeded during startup or conversion to operation using syngas fuel. For example, a saturator generally includes an operating requirement of being pre-warmed during startup and preventing boiling of the circulation loop. For protection of internal gas turbine components, the syngas supplied to the gas turbine typically is required to be superheated to a final temperature in the range of approximately 250 degrees Celsius. Additionally, diluent nitrogen is heated with extraction air and vent to atmosphere. Currently, such temperature requirements are met by venting heated syngas to flare during the startup process. However, using the existing warm-up line between the syngas stop and control valves to channel heated syngas to flare while meeting GT syngas temperature requirements and permissive causes visible flare and higher emissions for an extended time period and vents valuable syngas fuel to flare.

BRIEF DESCRIPTION OF THE INVENTION

In one embodiment, a method of operating an integrated gasification combined cycle system includes coupling a non-fuel fluid conduit to a fuel conduit, warming a flow of non-fuel fluid, and channeling the warmed non-fuel fluid through the fuel conduit such that heat from the warmed non-fuel fluid heats the fuel conduit to a predetermined temperature.

In another embodiment, an integrated gasification combined cycle system includes a fuel fluid conduit comprising an inlet from a supply of fuel fluid, the conduit configured to channel a flow of fuel to a combustor and to flare, and a non-fuel fluid conduit coupled in flow communication to the fuel fluid inlet conduit inlet such that in a first mode fuel fluid is channeled through the fuel fluid conduit from the inlet to at least one of the combustor and flare and in a second mode non-fuel fluid is channeled through the fuel fluid conduit from the inlet to flare.

In yet another embodiment, a method of heating a fuel supply system is provided. The fuel supply system includes a fuel inlet, piping configured to channel a flow of fuel to at least one of a combustor and a flare, and a fuel supply system heat exchanger coupled in flow communication with the fuel inlet. The method includes coupling an outlet of a first flow path of a non-fuel system heat exchanger in flow communication with the fuel inlet, heating a flow of non-fuel fluid using the non-fuel system heat exchanger, channeling the heated non-fuel fluid to the fuel inlet, heating the non-fuel fluid using the fuel supply system heat exchanger, and channeling the non-fuel fluid to flare.

DETAILED DESCRIPTION OF THE INVENTION

Figure 1:
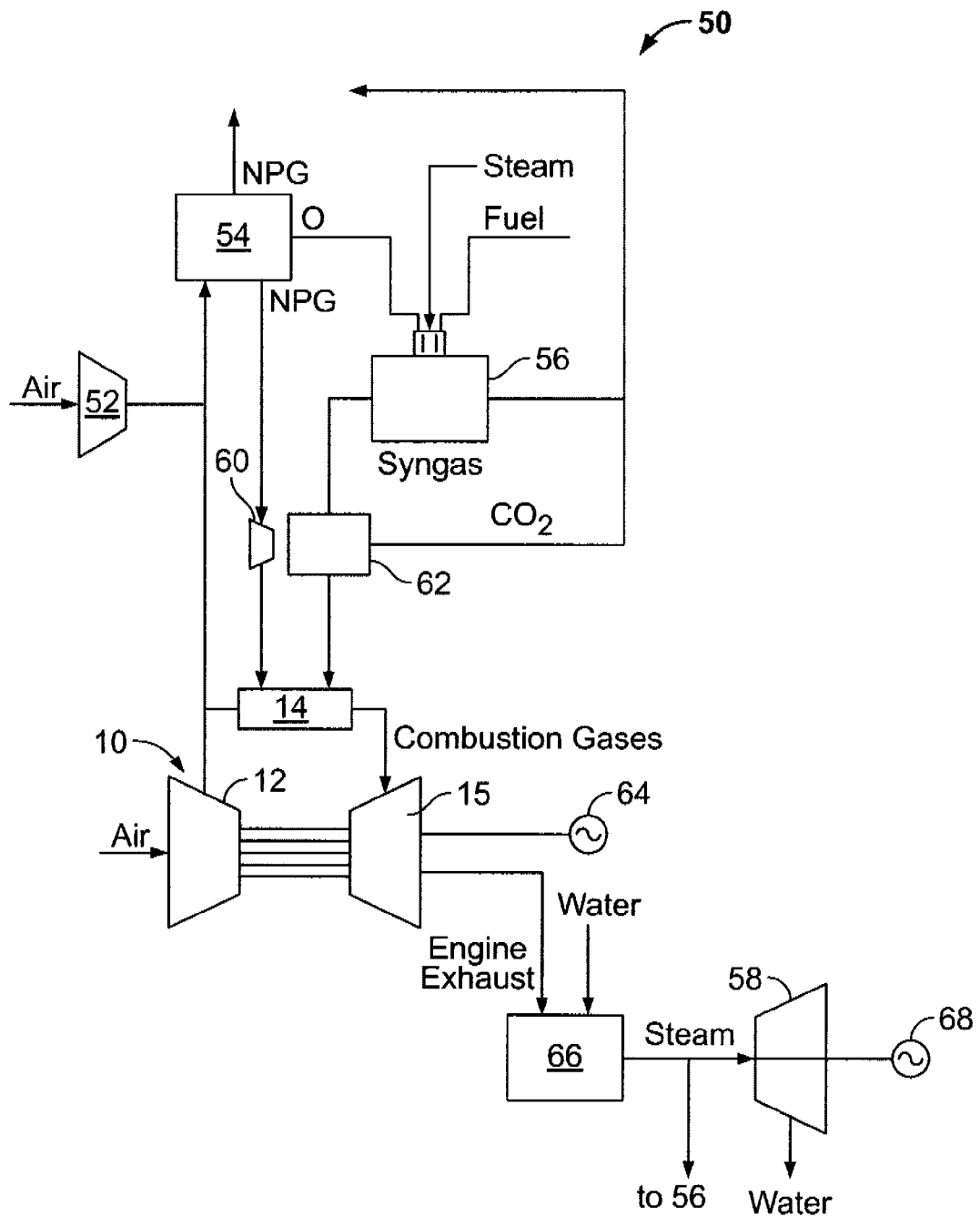
FIG. 1 is a schematic diagram of a portion of an exemplary integrated gasification combined-cycle (IGCC) power generation system.

FIG. 1 is a schematic diagram of a portion of an exemplary integrated gasification combined-cycle (IGCC) power generation system 50. IGCC system 50 generally includes a main air compressor 52, an air separation unit 54 coupled in flow communication to compressor 52, a gasifier 56 coupled in flow communication to air separation unit 54, a gas turbine engine 10, coupled in flow communication to gasifier 56, and a steam turbine 58. In operation, compressor 52 compresses ambient air. The compressed air is channeled to air separation unit 54. In some embodiments, in addition or alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas." The process gas generated by air separation unit 54 includes nitrogen and will be referred to herein as "diluent nitrogen." The diluent nitrogen may also include other gases such as, but not limited to, oxygen and/or argon. For example, in some embodiments, the diluent nitrogen includes between about 95% and about 100% nitrogen. The oxygen flow is channeled to gasifier 56 for use in generating partially combusted gases, referred to herein as "syngas" for use by gas turbine engine 10 as fuel, as described below in more detail. In some known IGCC systems 50, at least some of the diluent nitrogen flow, a by-product of air separation unit 54, is vented to the atmosphere. Moreover, in some known IGCC systems 50, some of the diluent nitrogen flow is injected into a combustion zone (not shown) within gas turbine engine combustor 14 to facilitate controlling emissions of engine 10, and more specifically to facilitate reducing the combustion temperature and reducing nitrous oxide emissions from engine 10. IGCC system 50 may include a compressor 60 for compressing the diluent nitrogen flow before being injected into the combustion zone.

Gasifier 56 converts a mixture of fuel, the oxygen supplied by air separation unit 54, steam, and/or limestone into an output of syngas for use by gas turbine engine 10 as fuel. Although gasifier 56 may use any fuel, in some known IGCC systems 50, gasifier 56 uses coal, petroleum coke, residual oil, oil emulsions, tar sands, and/or other similar fuels. In some known IGCC systems 50, the syngas generated by gasifier 56 includes carbon dioxide. The syngas generated by gasifier 56 may be cleaned in a clean-up device 62 before being channeled to gas turbine engine combustor 14 for combustion thereof or may be channeled to other systems for further processing, for example, to a Fischer-Tropsch synthesis reaction system for conversion to liquid hydrocarbons. Carbon dioxide may be separated from the syngas during clean-up and, in some known IGCC systems 50, vented to the atmosphere, sequestered for storage, or processed to industrial use gases. Gas turbine engine 10 develops power by expanding the combustion gases from combustor 14 in a turbine 15. The power output from gas turbine engine 10 drives a generator 64 that supplies electrical power to a power grid (not shown). Exhaust gas from gas turbine engine 10 is supplied to a heat recovery steam generator 66 that generates steam for driving steam turbine 58. Power generated by steam turbine 58 drives an electrical generator 68 that provides electrical power to the power grid. In some known IGCC systems 50, steam from heat recovery steam generator 66 is supplied to gasifier 56 for moderating the syngas.

Figure 2:
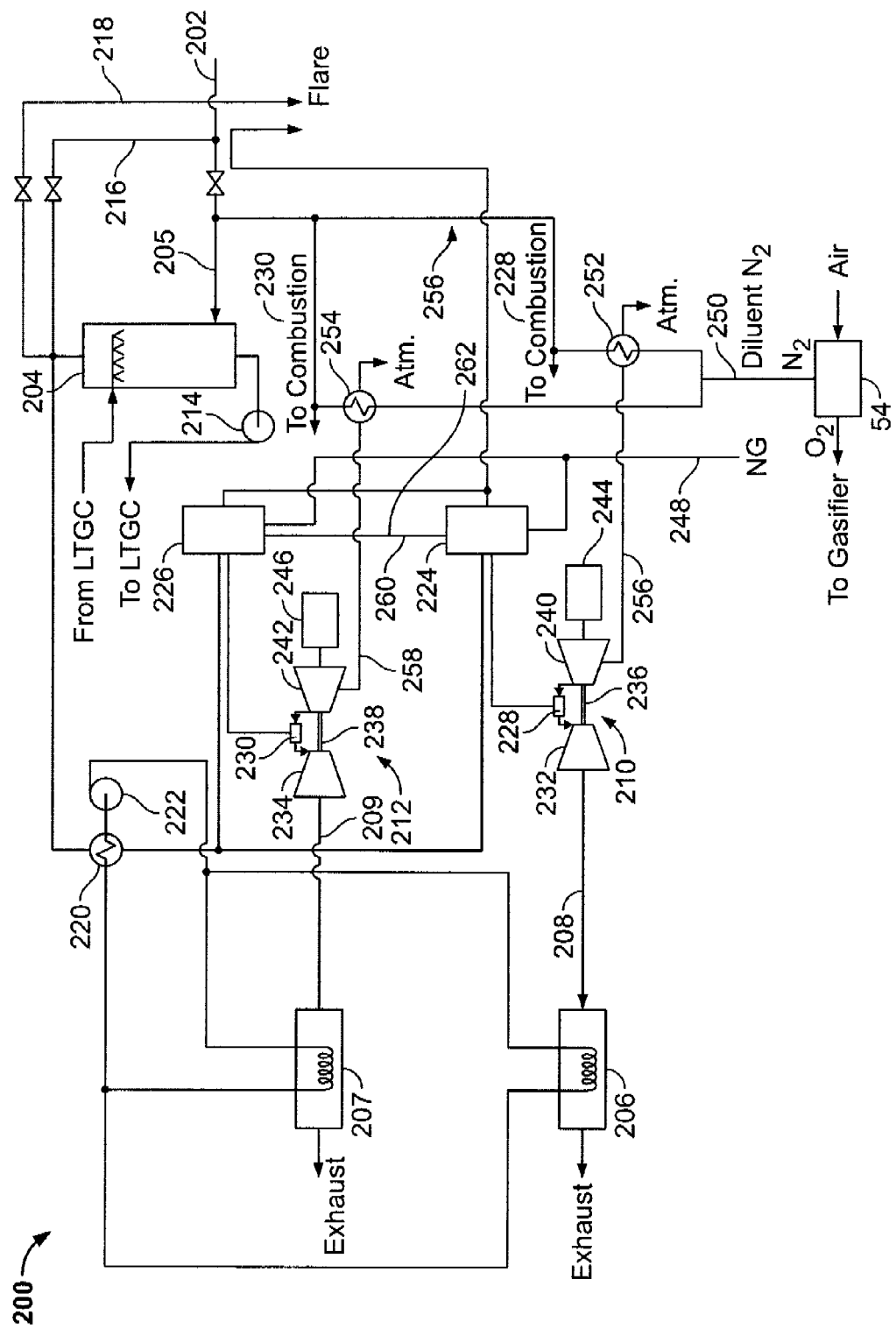
FIG. 2 is a schematic diagram of another portion of the IGCC system in accordance with an embodiment of the present invention.

FIG. 2 is a schematic diagram of another portion 200 of IGCC system 50 in accordance with an embodiment of the present invention. In the exemplary embodiment, portion 200 is a two unit portion of IGCC system 50 wherein two independent gas turbine generators are supplied by components of portion 200 that are shared between the two gas turbine generators. A flow of syngas 202 from for example, a gasification system or a gasification portion of IGCC system 50 is channeled to a syngas saturator 204 through a saturator inlet 205 where it is contacted with heated water that is circulated between a low temperature gas cooling system (not shown) and saturator 206 using a pump 214. The heated water circulating through saturator is kept from boiling by a pressurized nitrogen blanket. Alternatively, the flow of syngas 202 may be bypassed around saturator 206 through a bypass line 216. The flow of syngas 202 may be flared wet (after having passed through saturator 206) or dry (after having passed through bypass line 216) through flare line 218. If not flared, the flow of syngas 202 is channeled to a performance heater 220 where heat from a flow of water circulating through the tube side of performance heater 220 and a tube bundle in HRSG 206, 207 is transferred to the water. A circulating pump 222 provides the motive force for the water in performance heater 220 circuit. The flow of syngas 202 is then channeled to a respective fuel skid 224, 226 for each gas turbine engine 210, 212. The flow of syngas is then channeled to a combustor 228, 230 of a respective gas turbine engine 210, 212 where it is combusted to generate high pressure and high temperature gases to drive a turbine 232, 234 of gas turbine engines 210, 212 respectively. The exhausted gases are channeled through HRSG 206, 207 where remaining heat is extracted through a series of tube bundles to generate steam for a steam turbine (not shown in FIG. 2) and to heat water for various streams used in IGCC system 50. Turbines 232, 234 drive a shaft 236, 238 that in turn drives a compressor 240, 242 and a generator 244, 246.

During startup and prior to a transition to operation using syngas, fuel skids 224, 226 receive a flow of natural gas 248 from a source of natural gas. The flow of natural gas 248 is channeled to fuel skids 224, 226 to be controllably delivered to combustors 228, 230. Prior to transitioning to syngas fuel supplying gas turbines 210, 212 certain temperature limits and other permissions are required to be met. Included in these permissives are a requirement of the Saturator being pre-warmed during startup and preventing boiling of the circulation loop, a GT Syngas temperature of approximately 250 degrees Celsius, and to heat the diluent $N_2$ with extraction air and vent to atmosphere.

Various embodiments of the present invention use a non-fuel fluid such as diluent nitrogen extracted from an air separation unit (not shown) and heated using exhaust heat from gas turbines 210, 212 to facilitate meeting the above described permissives and reducing visible flare, and lowering emissions, lowering O&M fuel cost, and realizing high plant revenue by transferring from natural gas to syngas operation by gas turbines 210, 212, earlier in the warm-up process.

In the exemplary embodiment, a flow of diluent nitrogen 250 is channeled from for example, the air separation unit to a diluent nitrogen heater 252, 254. Diluent nitrogen heater 252, 254 heats the flow of diluent nitrogen 250 using heat from a flow of extraction air 256, 258 from turbines 210, 212, respectively. Rather than being supplied to combustors 228, 230 or released to atmosphere, the flow of diluent nitrogen 250 is channeled to saturator inlet 205 through a portion of piping 256 that couples the diluent nitrogen 250 circuit to the syngas 202 circuit to permit warm-up of the syngas piping using heated diluent nitrogen. The heated flow of diluent nitrogen is channeled through saturator 206 while picking up additional heat from a Low Temperature Gas Cooling section (not shown) from water circulated by pump 214. The flow of diluent nitrogen 250 is channeled to performance heater 220 where additional heat is received from HRSG 206, 207. The flow of diluent nitrogen 250 is then channeled to fuel skids 224, 226 where through a valve manifold (not shown), the flow of diluent nitrogen 250 is sent to flare. Maintaining the system piping warm (approximately 220 degrees Celsius or more) using the flow of diluent nitrogen 250 rather than by flaring syngas to warm up the piping and system components permits reducing visible flare, and lowering emissions, lowering O&M fuel cost, and realizing high plant revenue by transferring from natural gas to syngas operation by gas turbines 210, 212, earlier in the warm-up process.

During single unit operation, a crossover line 260 between fuel skid 224 and 226 is used during turn-down when one gas turbine is secure to maintain line 260 warm or for start-up of the second gas turbine engine when the first gas turbine engine is operating.

Exemplary embodiments of IGCC systems and methods of minimizing emissions are described above in detail. The IGCC system components illustrated are not limited to the specific embodiments described herein, but rather, components of each system may be utilized independently and separately from other components described herein. For example, the IGCC system components described above may also be used in combination with different IGCC system components.

The above-described IGCC systems and methods are cost-effective and highly reliable. The method permits maintaining the system piping warm using the flow of diluent nitrogen rather than by flaring syngas to warm up the piping and system components which permits reducing visible flare, and lowering emissions, lowering O&M fuel cost, and realizing high plant revenue by transferring from natural gas to syngas operation by the gas turbines, earlier in the warm-up process. Accordingly, the systems and methods described herein facilitate the operation of IGCC systems in a cost-effective and reliable manner.

While the invention has been described in terms of various specific embodiments, those skilled in the art will recognize that the invention can be practiced with modification within the spirit and scope of the claims.

What is claimed is:

1. A method of operating an integrated gasification combined cycle system comprising:
    coupling a non-fuel fluid conduit to a fuel conduit;
    warming a flow of diluent nitrogen; and
    channeling the warmed diluent nitrogen through the fuel conduit such that heat from the warmed diluent nitrogen heats the fuel conduit to a predetermined temperature.

2. A method in accordance with claim 1 wherein warming the flow of diluent nitrogen comprises warming the flow of diluent nitrogen from an air separation unit.

3. A method in accordance with claim 1 wherein warming the flow of diluent nitrogen comprises warming the flow of diluent nitrogen using turbine extraction air.

4. A method in accordance with claim 1 wherein warming the flow of diluent nitrogen comprises warming the flow of diluent nitrogen using a fuel fluid saturator that is isolated from a source of fuel fluid.

5. A method in accordance with claim 1 wherein warming the flow of diluent nitrogen comprises warming the flow of diluent nitrogen using heat from a turbine exhaust transferred through a water/gas heat exchanger.

6. A method in accordance with claim 1 further comprising channeling the diluent nitrogen to flare after warming the fuel conduit.

7. A method in accordance with claim 1 further comprising:
warming the fuel conduit to a predetermined temperature using the flow of heated diluent nitrogen wherein the diluent nitrogen is channeled to flare during the warming; and
purging the diluent nitrogen from the fuel conduit using a flow of fuel for a first time period such that the flow of fuel is channeled to flare during the purging wherein if the fuel conduit were warmed to the predetermined temperature using a flow of fuel channeled to flare in a second time period, the first time period is shorter than the second time period.

8. A method in accordance with claim 1 wherein channeling the warmed diluent nitrogen through the fuel conduit such that heat from the warmed diluent nitrogen heats the fuel conduit to a predetermined temperature comprises heating the fuel conduit to a temperature of between approximately 177 degrees Celsius and approximately 232 degrees Celsius.

9. A method in accordance with claim 8 wherein channeling the warmed diluent nitrogen through the fuel conduit such that heat from the warmed diluent nitrogen heats the fuel conduit to a predetermined temperature comprises heating the fuel conduit to a temperature of approximately 220 degrees Celsius.

10. A method in accordance with claim 1 wherein the integrated gasification combined cycle system includes a first fuel conduit coupled to a first gas turbine engine through a first fuel valve manifold and a second fuel conduit coupled to a second gas turbine engine through a second fuel value manifold, said method further comprising coupling the first fuel valve manifold to the second fuel valve manifold during operation of the first gas turbine engine while the second gas turbine engine is in a warm-up condition such that warm fuel fluid from the first fuel valve manifold is used to warm the second fuel valve manifold and associated piping.

11. An integrated gasification combined cycle system comprising:
a fuel fluid conduit comprising an inlet from a supply of fuel fluid, said conduit configured to channel a flow of fuel to a combustor and to flare; and
a non-fuel fluid conduit coupled in flow communication to said fuel fluid inlet conduit inlet such that in a first mode fuel fluid is channeled through said fuel fluid conduit from said inlet to at least one of the combustor and flare and in a second mode non-fuel fluid is channeled through said fuel fluid conduit from said inlet to flare.

12. A system in accordance with claim 11 further comprising a gasifier configured to generate a flow of fuel fluid from a carbonaceous fuel comprising coal.

13. A system in accordance with claim 11 further comprising a saturator configured to increase at least one of a moisture content and a temperature of said fuel fluid.

14. A system in accordance with claim 11 further comprising a saturator configured to receive a flow of warm non-fuel fluid heated using extraction air from a compressor.

15. A system in accordance with claim 11 further comprising a heat exchanger comprising a first flow path coupled in flow communication with a water tube bundle of a heat recovery steam generator and a second flow path coupled in flow communication with said fuel conduit, said heat exchanger configured to facilitate transferring heat from said water tube bundle to said fuel conduit.

16. A method of heating a fuel supply system, said fuel supply system including a fuel inlet, piping configured to channel a flow of fuel to at least one of a combustor and a flare, and a fuel supply system heat exchanger coupled in flow communication with the fuel inlet, said method comprising:
coupling an outlet of a first flow path of a non-fuel system heat exchanger in flow communication with the fuel inlet;
heating a flow of non-fuel fluid using the non-fuel system heat exchanger;
channeling the heated non-fuel fluid to the fuel inlet;
heating the non-fuel fluid using the fuel supply system heat exchanger; and
channeling the non-fuel fluid to flare.

17. A method in accordance with claim 16 further comprising coupling a second flow path of the non-fuel system heat exchanger to a compressor extraction air discharge.

18. A method in accordance with claim 16 further comprising configuring a first fuel system valve manifold to channel fuel from a first manifold inlet to at least one of the combustor and flare, the manifold further configured to couple the first manifold inlet to a second manifold inlet of a second fuel system valve manifold, the method further comprising channeling the flow of non-fuel fluid from the first inlet to the second inlet.

19. A method in accordance with claim 16 wherein heating a flow of non-fuel fluid using the non-fuel system heat exchanger comprises heating a flow of nitrogen from an air separation unit in the non-fuel system heat exchanger using extraction air from a compressor.

20. A method in accordance with claim 16 wherein heating the non-fuel fluid using the fuel supply system heat exchanger comprises heating the non-fuel fluid using a circulating water circuit that receives heat from a gas turbine engine exhaust.

* * * * *